United States Patent
Kaiser et al.

(10) Patent No.: US 10,063,142 B2
(45) Date of Patent: Aug. 28, 2018

(54) BIPOLAR HIGH-VOLTAGE NETWORK AND METHOD FOR OPERATING A BIPOLAR HIGH-VOLTAGE NETWORK

(71) Applicant: Airbus Operations GmbH, Hamburg (DE)

(72) Inventors: Alexander Kaiser, Hamburg (DE); Joerg Wangemann, Hamburg (DE); Hauke-Peer Luedders, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 357 days.

(21) Appl. No.: 14/626,344

(22) Filed: Feb. 19, 2015

(65) Prior Publication Data

US 2015/0244259 A1  Aug. 27, 2015

(30) Foreign Application Priority Data

Feb. 21, 2014  (DE) .......................... 10 2014 203 157

(51) Int. Cl.
*H02M 3/155* (2006.01)
*B60R 16/033* (2006.01)
(Continued)

(52) U.S. Cl.
CPC ........... *H02M 3/155* (2013.01); *B60R 16/033* (2013.01); *B64D 41/00* (2013.01); *H02M 3/158* (2013.01);
(Continued)

(58) Field of Classification Search
CPC . Y02T 10/7005; Y02T 10/7077; B60R 16/03; B60R 16/0315; B60L 11/14
(Continued)

(56) References Cited

U.S. PATENT DOCUMENTS 5,345,375 A * 9/1994 Mohan ...................... H02J 3/01
307/105
5,574,636 A * 11/1996 Lee ...................... H02M 5/4585
363/132
(Continued)

FOREIGN PATENT DOCUMENTS

CH           698490      8/2009
DE    102006014780     10/2007
(Continued)

OTHER PUBLICATIONS

German Search Report, dated Feb. 21, 2014.

*Primary Examiner* — Quan Tra
(74) *Attorney, Agent, or Firm* — Greer, Burns & Crain Ltd.

(57) ABSTRACT

An aircraft bipolar high-voltage network includes a DC voltage converter comprising two unipolar input connections, two bipolar output connections and a reference potential connection, and at least one unipolar device having two electrical connections which are each coupled to one of the two unipolar input connections. The DC voltage converter has a first DC voltage converter module coupled to a first of the unipolar input connections via a module input connection, to the reference potential connection via a module reference potential connection and to a first of the bipolar output connections via a module output connection, and a second DC voltage converter module coupled to a second of the unipolar input connections via a module input connection, to the reference potential connection via a module reference potential connection and to a second of the bipolar output connections via a module output connection.

18 Claims, 4 Drawing Sheets

(51) Int. Cl.
B64D 41/00 (2006.01)
H02M 3/158 (2006.01)
H02M 7/487 (2007.01)
H02M 1/00 (2006.01)

(52) U.S. Cl.
CPC ....... *B64D 2221/00* (2013.01); *H02M 3/1582* (2013.01); *H02M 7/487* (2013.01); *H02M 2001/0074* (2013.01); *H02M 2001/0077* (2013.01)

(58) Field of Classification Search
USPC .......................................................... 307/9
See application file for complete search history.

(56) References Cited

U.S. PATENT DOCUMENTS

| | | | | |
|---|---|---|---|---|
| 5,932,995 | A * | 8/1999 | Wagoner | H02M 3/158 323/222 |
| 6,002,603 | A * | 12/1999 | Carver | H02M 3/158 363/132 |
| 7,208,922 | B2 * | 4/2007 | Kalfhaus | H02M 3/33569 323/222 |
| 8,547,073 | B2 * | 10/2013 | Fujii | H02M 3/1588 323/222 |
| 8,692,477 | B1 * | 4/2014 | Lee | H05B 33/0815 315/185 S |
| 2003/0117209 | A1 * | 6/2003 | Tsuchiya | H02M 3/1582 327/530 |
| 2006/0145675 | A1 * | 7/2006 | Lee | H02M 3/156 323/282 |
| 2007/0075689 | A1 | 4/2007 | Kinder et al. | |
| 2008/0174287 | A1 * | 7/2008 | Park | H02M 3/158 323/271 |
| 2009/0085537 | A1 | 4/2009 | Nakabayashi et al. | |
| 2010/0019833 | A1 * | 1/2010 | Zang | A61B 8/467 327/538 |
| 2010/0039080 | A1 * | 2/2010 | Schoenbauer | H02M 3/1582 323/234 |
| 2010/0194344 | A1 * | 8/2010 | Greyling | H02M 3/157 320/128 |
| 2010/0289423 | A1 | 11/2010 | Yao et al. | |
| 2011/0103118 | A1 * | 5/2011 | Serpa | H02M 3/158 363/132 |
| 2013/0049730 | A1 * | 2/2013 | Kato | H01L 23/642 323/355 |
| 2013/0200715 | A1 | 8/2013 | Pettersson et al. | |
| 2013/0229839 | A1 | 9/2013 | Escobar et al. | |
| 2014/0022149 | A1 * | 1/2014 | Kwon | G09G 3/3233 345/76 |
| 2014/0111005 | A1 * | 4/2014 | Liu | H02J 9/04 307/20 |
| 2015/0009734 | A1 | 1/2015 | Stahl et al. | |
| 2015/0295491 | A1 * | 10/2015 | Lenz | H02J 3/383 323/234 |
| 2015/0349638 | A1 * | 12/2015 | Sylla | H02M 3/1584 307/10.1 |

FOREIGN PATENT DOCUMENTS

| | | |
|---|---|---|
| DE | 102010035020 | 2/2012 |
| DE | 102012005974 | 9/2013 |
| EP | 2624433 | 8/2013 |
| WO | 2011020737 | 2/2011 |

* cited by examiner

BIPOLAR HIGH-VOLTAGE NETWORK AND METHOD FOR OPERATING A BIPOLAR HIGH-VOLTAGE NETWORK

CROSS-REFERENCES TO RELATED APPLICATIONS

This application claims the benefit of the German patent application No. 102014203157.5 filed on Feb. 21, 2014, the entire disclosures of which are incorporated herein by way of reference.

FIELD OF THE INVENTION

The present invention relates to a bipolar high-voltage network and to a method for operating a bipolar high-voltage network, in particular for the distribution of electrical power in an aircraft or spacecraft.

BACKGROUND OF THE INVENTION

Bipolar high-voltage voltages, for example ±270 V bipolar DC voltage, are often required in aircraft. Generators and appropriate rectifiers are usually used to provide voltages of this type.

EP 2 624 433 A1 discloses two non-isolated DC voltage converter units which are connected in parallel and have a neutral point, which is galvanically isolated from a neutral point of the DC voltage converter units, of an AC voltage filter connected downstream of the DC voltage converter units for feeding DC voltage generated by photovoltaic cells into an AC voltage network.

US 2009/0085537 A1 discloses a non-isolated boost converter for DC voltages, in which a unipolar input DC voltage is converted into a bipolar output DC voltage by two coupled boost converter units.

The document "Analyse einer neuartigen elektrischen Konverterarchitektur zur Integration von Brennstoffzellen auf Gesamtsystemebene" ["Analysis of a new electrical converter architecture for the integration of fuel cells to the overall system plane"] by A. Lücken, H Lüdders, T. Kut, S. Dickmann, F. Thielecke and D. Schulz, Deutscher Luft- und Raumfahrtkongress 2012 [German Aeronautics and Astronautics Congress], Berlin, Deutsche Gesellschaft fur Luft- und Raumfahrt [German Society for Aeronautics and Astronautics]-Lilienthal-Oberth e.V., Bonn, 2012, discloses a fuel cell system having two fuel cell stacks which are arranged in a series-connected manner and supply positive and negative output voltages for one DC voltage converter module in each case, in order to generate positive and negative high-voltage DC voltages for a bipolar DC voltage network in an aircraft.

The document "Symmetrical Boost Concept for Solar Applications up to 1000V" by M. Frisch and T. Ernö, Vinotech GmbH, 2009 discloses a transformer-less DC voltage converter for solar cells for generating multi-phase AC voltages.

SUMMARY OF THE INVENTION

There is, however, a need for solutions for high-voltage networks in aircraft that are reliable and highly available, yet still have a low system weight and can be operated by connection devices of various voltage consumptions.

Therefore, according to a first aspect of the invention, there is provided a bipolar high-voltage network for an aircraft or spacecraft, comprising a DC voltage converter which comprises two unipolar input connections, two bipolar output connections and a reference potential connection, and at least one unipolar device having two electrical connections which are each coupled to one of the two unipolar input connections. The DC voltage converter comprises a first DC voltage converter module which is coupled to a first of the unipolar input connections of the DC voltage converter via a module input connection, to the reference potential connection of the DC voltage converter via a module reference potential connection and to a first of the bipolar output connections of the DC voltage converter via a module output connection, and comprises a second DC voltage converter module which is coupled to a second of the unipolar input connections of the DC voltage converter via a module input connection, to the reference potential connection of the DC voltage converter via a module reference potential connection and to a second of the bipolar output connections of the DC voltage converter via a module output connection.

Furthermore, according to a second aspect of the invention, an aircraft or spacecraft having one or more bipolar high-voltage networks according to the invention is provided according to a first aspect.

According to a third aspect, the invention further provides a method for operating a high-voltage network according to the invention, comprising the steps of operating the DC voltage converter in order to output a bipolar voltage between the bipolar output connections and the reference potential connection of the DC voltage converter, detecting whether a short circuit is present between a first of the bipolar output connections and the reference potential connection and/or whether a high-resistance fault is present at a first of the bipolar output connections, and operating the DC voltage converter in order to output a unipolar voltage between the second of the bipolar output connections and the reference potential connection of the DC voltage converter if a short circuit and/or a high-resistance fault has been detected. The method offers the advantage that in many fault situations, the bipolar high-voltage network is operated further in a mode of operation having restricted operating conditions (degraded mode of operation) in order to at least maintain a temporary emergency mode of operation.

In addition, using the method, the DC voltage converter is able to drive a short circuit current, at least up to the current load limit thereof. The process according to the method can make sub-networks of the high-voltage network open in the event of a short circuit, which sub-networks are protected by fuses having overcurrent protection. In the event of a short circuit between a first of the bipolar output connections and the reference potential connection, the output voltage at said bipolar output connection drops and the output current rises above a predetermined controller threshold. If the short circuit has been caused by components in this sub-network, the sub-network can be isolated and the rest of the high-voltage network can then continue to be operated as normal.

According to one embodiment of the high-voltage network according to the invention, the DC voltage converter modules can each comprise non-isolated DC voltage converters. Owing to the design as non-isolated DC voltage converters, it is possible to advantageously reduce the system weight since heavy components such as transformers or additional chokes can be omitted.

According to further embodiments of the high-voltage network according to the invention, the DC voltage converter modules can in this case each comprise down converters, up converters, inverse converters, cascade-connected down/up converters, cascade-connected two-point down/up converters, open-loop-controlled or non-open-loop-controlled two-point NPC converters or split-pi converters.

According to a further embodiment of the high-voltage network according to the invention, the high-voltage network can further comprise a unipolar up converter which is coupled between the unipolar input connections of the DC voltage converter and the module input connections of the DC voltage converter modules. In this case, the DC voltage converter modules can each comprise down converters which in this case can be formed in particular by an open-loop-controlled or non-open-loop-controlled two-point NPC converter.

According to a further embodiment of the high-voltage network according to the invention, the high-voltage network can further comprise an open-loop-controlled three-point NPC power converter, the input of which is coupled to the two bipolar output connections and to the reference potential connection of the DC voltage converter and the output of which comprises three AC voltage phase connections, and an LC filter stage which is coupled to the three AC voltage phase connections of the open-loop-controlled three-point NPC power converter.

According to a further embodiment of the high-voltage network according to the invention, the high-voltage network can further comprise a first DC voltage intermediate circuit, which is coupled between the unipolar input connections of the DC voltage converter, and a second DC voltage intermediate circuit, which is coupled between the bipolar output connections of the DC voltage converter.

BRIEF DESCRIPTION OF THE DRAWINGS

The invention will be described in greater detail in the following in conjunction with and in relation to the embodiments as in the accompanying drawings.

The accompanying drawings give a better understanding of the present invention and show example variants of the invention. They serve to explain principles, advantages, technical effects and possible variations. Naturally, other embodiments and many of the intended advantages of the invention are also conceivable, in particular in view of the detailed description of the invention set out in the following. The elements in the drawings are not necessarily shown to scale, and are shown in a simplified form or schematically in some cases for reasons of clarity. Like reference signs denote like or similar components or elements.

DETAILED DESCRIPTION OF THE PREFERRED EMBODIMENTS

Although specific embodiments are described and shown herein, it is clear to a person skilled in the art that a wealth of additional, alternative and/or equivalent implementations can be selected for the embodiments, without substantially deviating from the basic idea of the present invention. In general, any variations on, modifications to and alterations to the embodiments disclosed herein should also be considered to be covered by the invention.

Any loads, power consumers, electrical energy stores, energy sources or sub-networks which can output and/or consume electrical DC voltage between two connections constitute unipolar devices in the context of the present invention. In particular, unipolar devices in the context of the invention can include fuel cells, photovoltaic cells, capacitors, accumulators, DC machines and other electrical loads or energy sources.

Any loads, power consumers, electrical energy stores, energy sources or sub-networks that have three electrical connections and can output and/or consume two different electrical DC voltages, in particular DC voltages of opposite polarity, between two of the connections in each case constitute bipolar devices in the context of the invention. Corresponding electrical networks that are operated with bipolar high voltage, i.e., can consume and/or output bipolar voltage, thus constitute bipolar high-voltage networks in the context of the present invention.

Electrical machines in the context of the present invention can include, for example, induction machines such as synchronous or asynchronous machines, reluctance machines, split-pole machines, DC machines, repulsion machines or other types of machine.

Figure 1:
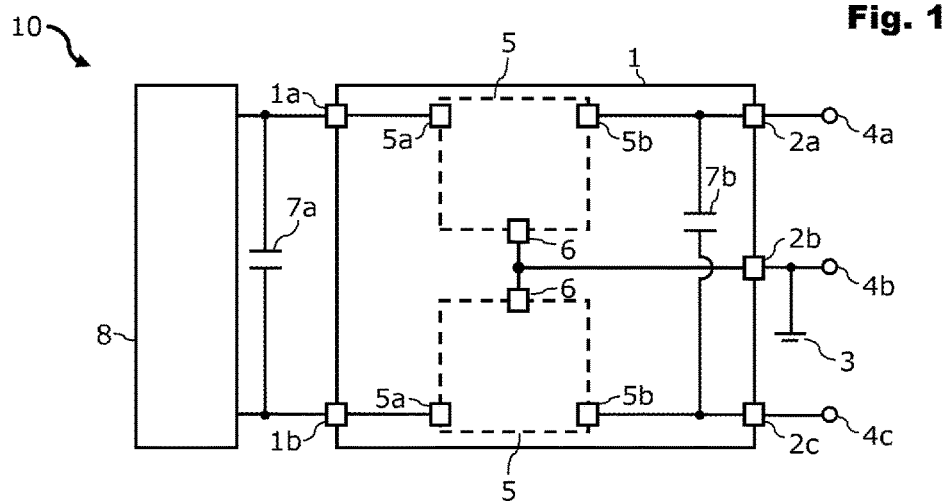
FIG. 1 is a schematic view of a bipolar high-voltage network according to an embodiment of the invention.

FIG. 1 is a schematic view of a bipolar high-voltage network 10. The bipolar high-voltage network 10 comprises a DC voltage converter 1 which is fed a unipolar input voltage at two input connections 1a and 1b and converts said unipolar input voltage into a bipolar output voltage at the three output connections 2a, 2b and 2c. The output connections 2a and 2c are both DC voltage output connections 2a and 2c which are each coupled to tapping terminals 4a and 4c. The output connection 2b is a reference potential connection 2b which is coupled to an earth potential or reference potential 3 and can be tapped at a reference potential terminal 4b. Here, the terminals 4a, 4b and 4c can be coupled to a bipolar network (not shown explicitly), for example to a bipolar high-voltage network of an aircraft or spacecraft. When the bipolar high-voltage network 10 is used in an aircraft, a high-voltage DC voltage, for example ±270 V, which is bipolar with respect to the reference potential connection 2b, can be tapped at the tapping terminals 4a and 4c. The reference potential 3 of the reference potential connection 2b can be fixed by appropriate actuation of the DC voltage converter 1 and does not necessarily have to be located in the center between the two potentials at the output connections 2a and 2c. For example, an asymmetric bipolar high-voltage voltage can also be provided at the tapping terminals 4a and 4c with respect to the reference potential connection 2b, i.e., the sizes of the two bipolar voltage portions generated by the bipolar high-voltage network 10 can be different.

In this case, the DC voltage converter 1 comprises two DC voltage converter modules 5 which are actuated separately. The DC voltage converter modules 5 are each coupled to one of the unipolar input connections 1a and 1b via a module input connection 5a, to the reference potential connection 2b via a module reference potential connection 6 and to one of the bipolar output connections 2a or 2c of the DC voltage converter 1 via a module output connection 5b. If the electrical connections of one (or more) unipolar devices 8 are coupled to one of the two unipolar input connections 1a or 1b, the DC voltage converter modules 5 can each generate, from the single input potential, a branch of the bipolar voltage supply to the module output connections 5b with respect to the reference potential 3 at the module reference potential connection 6.

In this respect, the unipolar device 8 can comprise purely DC voltage sources, such as fuel cells, purely DC voltage loads, such as technical loads of an aircraft, bidirectionally operable DC voltage devices, such as motors/generators, or electrically rechargeable energy storage devices, such as batteries or supercaps.

Depending on the type of the unipolar device 8, the DC voltage converter 1 can in this case also be operated bidirectionally, i.e., the output connections 2a and 2c can also function as input connections for converting a bipolar input voltage into a unipolar output voltage at the input connections 1a and 1b acting as unipolar output connections.

The first (upper) DC voltage converter module 5 can be configured to provide a first high-voltage DC voltage between the module output connection 5b and the module reference potential connection 6. Similarly, the second (lower) DC voltage converter module 5 can be designed to provide a second high-voltage DC voltage between the associated module output connection 5b and the module reference potential connection 6. Here, the first and second high-voltage DC voltages can have a different polarity sign from the reference potential 3, and can in particular be of the same value, for example +/−270 V or +/−135 V. It is of course also possible to actuate the two DC voltage converter modules 5 in order to output high-voltage DC voltages of different sizes.

Due to the configuration in FIG. 1, an implicit redundancy of the high-voltage network 10 is ensured with respect to high impedances ("open circuit state") at one of the output connections 2a or 2c or with respect to short circuits between earth and one of the output connections 2a or 2c. This advantageously allows the high-voltage network 10 to be operated in a restricted mode of operation ("degraded operation"), so that only limited additional safety measures would have to be taken. In particular, measures in the backend of the high-voltage network 10 can be avoided, for example conditional switching elements or diodes, with a corresponding simplification in implementation and a reduction of costs. In the case of load operation of the DC voltage converter modules 5, the connected loads and energy sources must then naturally be operable at half the operating voltage, i.e., at an operating voltage which is half the operating voltage in normal operation.

Input-side and output-side intermediate circuits having intermediate circuit capacitors 7a and 7b are used in each case to buffer voltage peaks and to reject common-mode fluctuations.

FIGS. 2 to 8 schematically show, by way of example, variants of DC voltage converter modules 5 of this type. In this context, the DC voltage converter modules 5 in FIGS. 2 to 8 can be used in a DC voltage converter, such as the DC voltage converter 1 in FIG. 1. Advantageously, two similar converter topologies can be implemented in parallel with one another in each case. The converter topologies all share the feature that they each comprise non-isolated DC voltage converters. Non-isolated DC voltage converters have a low system weight, since complex and heavy transformers can largely be omitted.

Figure 3:
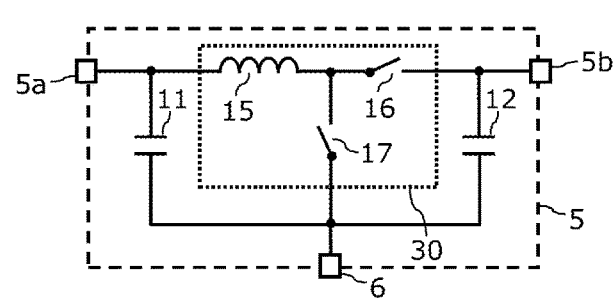
FIG. 3 is a schematic view of a DC voltage converter module for a high-voltage network according to FIG. 1 in accordance with a further embodiment of the invention.
Figure 4:
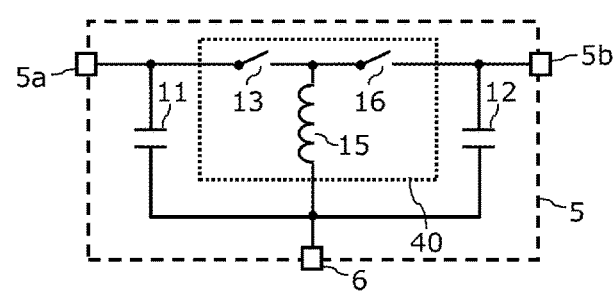
FIG. 4 is a schematic view of a DC voltage converter module for a high-voltage network according to FIG. 1 in accordance with a further embodiment of the invention.

In FIG. 3, the DC voltage converter modules 5 are formed as bi-directional down converters 20 having charging capacitors 11 and 12, converter switches 13 and 14 and a choke 15. In FIG. 4, the DC voltage converter modules 5 are formed as bi-directional up converters 30 having charging capacitors 11 and 12, converter switches 16 and 17 and a choke 15. These types of converters are particularly advantageous for applications with high power requirements, in which the ratio between input and output voltage is close to 1.

Figure 5:
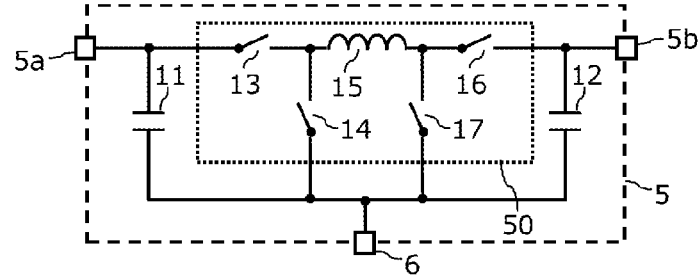
FIG. 5 is a schematic view of a DC voltage converter module for a high-voltage network according to FIG. 1 in accordance with a further embodiment of the invention.

As shown in FIG. 5, the DC voltage converter modules 5 can be implemented as bi-directional inverse converters 40 having charging capacitors 11 and 12, converter switches 13 and 16, and a choke 15. This topology can guarantee both boost converter operation and step-down converter operation in both converter directions, and offers the lowest number of active elements.

Figure 6:
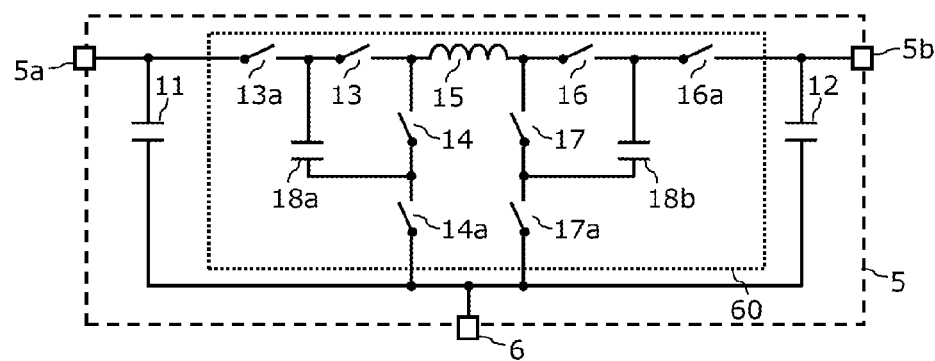
FIG. 6 is a schematic view of a DC voltage converter module for a high-voltage network according to FIG. 1 in accordance with a further embodiment of the invention.

FIG. 6 shows DC voltage converter modules 5 each formed as cascade-connected down/up converters 50 having charging capacitors 11 and 12, converter switches 13, 14, 16 and 17 and a choke 15. Cascade-connected down/up converters 50 can function in an efficient manner in terms of power if the ratio between input and output voltage is close to 1.

Figure 7:
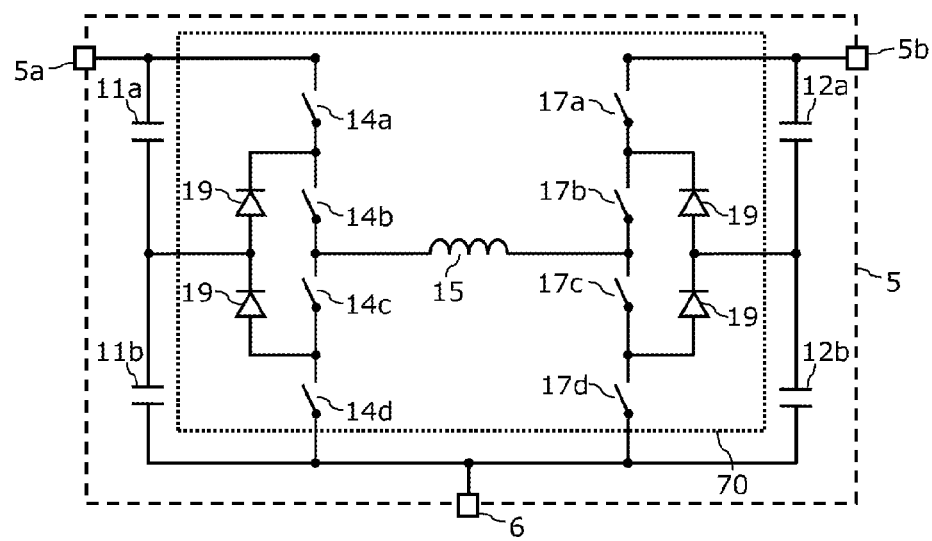
FIG. 7 is a schematic view of a DC voltage converter module for a high-voltage network according to FIG. 1 in accordance with a further embodiment of the invention.

FIG. 7 shows the DC voltage converter modules 5 each formed as cascade-connected two-point down/up converters 60 which comprise charging capacitors 11 and 12, converter switches 13, 13a, 14, 14a, 16, 16a, 17 and 17a and a choke 15. What are referred to as flying capacitors 18a and 18b are wired between half bridges, which are each formed of two converter switches. A bridge voltage is applied to such cascade-connected two-point down/up converters 60, which are often also referred to as flying capacitor multilevel converters/inverters (FMCI), at the outer connections thereof to the half bridges, such that the central connection is used for tapping the output voltage. In this case, the flying capacitors have a potential which constantly shifts with respect to an input connection of the half bridges.

According to FIG. 7, the DC voltage converter modules 5 can each include open-loop-controlled or non-open-loop-controlled two-point NPC converters 70. For this purpose, zero diodes 19 ("neutral point clamped diodes," NPC diodes) can be wired in each case in the center tap between multistage bridge branches formed of converter switches 14a, 14b, 14c, 14d or 17a, 17b, 17c and 17d. In this respect, it can also be possible to replace the zero diodes 19 with active switching elements, such as power semiconductor switches, or to wire active switching elements in parallel with the zero diodes 19, so that it is possible to achieve an ANPC (active neutral point clamped) power converter. By means of an appropriate switching strategy of the active switching elements, such as IGBT or MOSFET power semiconductor switches, the output voltage can thereby be clamped in an active manner with respect to the reference potential of the rectifier circuit. Series-connected charging capacitors 11 and 11*a* or 12 and 12*a* are used to stabilize the voltage in the multiple voltage stages generated in each case. By using two-point NPC converters 70, the power efficiency increases at the expense of the circuit complexity.

Figure 8:
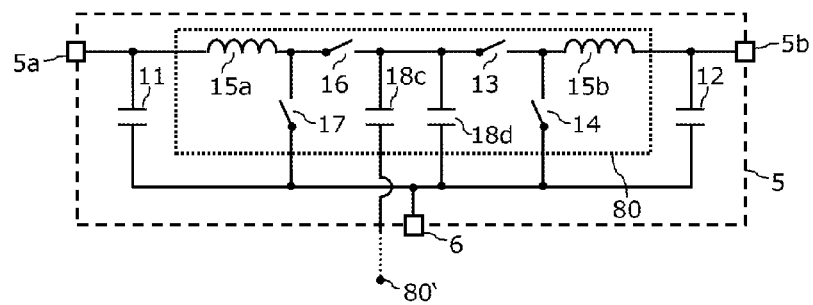
FIG. 8 is a schematic view of a DC voltage converter module for a high-voltage network according to FIG. 1 in accordance with a further embodiment of the invention.

As shown in FIG. 8, the DC voltage converter modules 5 can each comprise split-pi converters 80, which are formed of charging capacitors 11, 12, converter switches 13, 14, 16 and 17 and two chokes 15*a*, 15*b*. The split-pi converter 80 is a series connection of two synchronous converters which are buffered by an intermediate circuit capacitor 18*d* therebetween. In addition to the intermediate circuit capacitor 18*d*, an intermediate circuit capacitor 18*c* is provided, which couples a central tap of the live bus rail between the synchronous converters of one of the split-pi converters 80 with the respective bus rail of the other split-pi converter 80' of a DC voltage converter module 5. The split-pi converter 80 allows for both step-down converter operation and boost converter operation in both energy flow directions. Owing to the continuous energy flow, the split-pi converter 80 is particularly efficient and offers good electromagnetic compatibility (EMC).

By using two DC voltage converter modules 5 that can be operated and controlled, in a closed-loop manner, independently of one another, in-phase voltage fluctuations between the output connections 2*a* or 2*c* and the reference potential connection 2*b* can be prevented, in particular if the DC voltage converter modules 5 are operated in current-controlled closed-loop operation. This applies to all the converter topologies 20, 30, 40, 50, 60, 70 and 80 in FIGS. 2 to 8.

Figure 2:
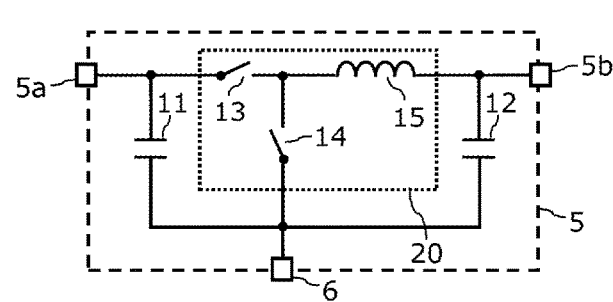
FIG. 2 is a schematic view of a DC voltage converter module for a high-voltage network according to FIG. 1 in accordance with a further embodiment of the invention.
Figure 9:
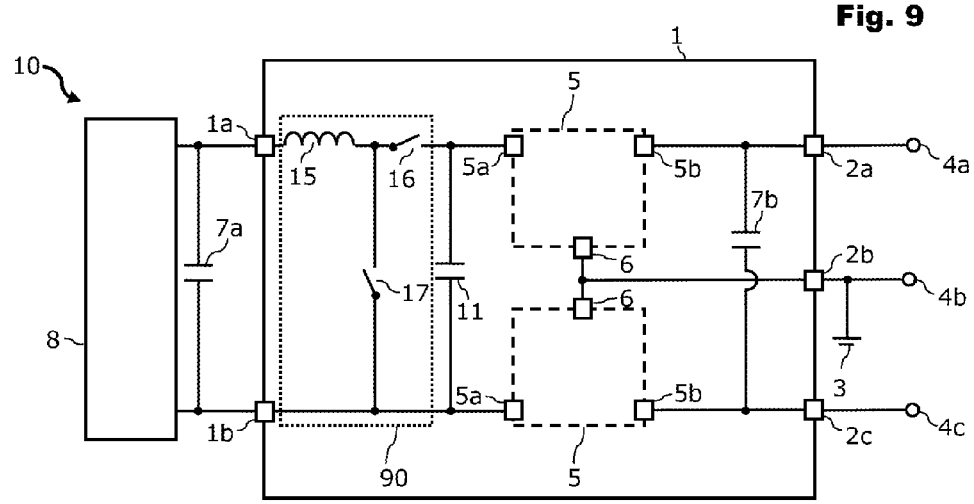
FIG. 9 is a schematic view of a bipolar high-voltage network in accordance with a further embodiment of the invention.

The bipolar high-voltage network 10 in FIG. 9 is designed in a similar manner to the split-pi converter 80 in FIG. 8. Instead of two bipolar boost converter stages at the module input connections 5*a*, a unipolar up converter 90 can be used which overlaps the module, has a choke 15 and converter switches 16 and 17, and is coupled between the unipolar input connections 1*a*, 1*b* of the DC voltage converter 1 and the module input connections 5*a* of the DC voltage converter modules 5. The DC voltage converter modules 5 then only have to each comprise down converters, for example the down converter 20 as shown in FIG. 2. The unipolar up converter 90 can be isolated from the DC voltage converter modules 5 via an intermediate circuit capacitor 11. One requirement for an input-side unipolar up converter stage 90 is a closed-loop-controlled unipolar input voltage at the input connections 1*a* and 1*b*.

Figure 10:
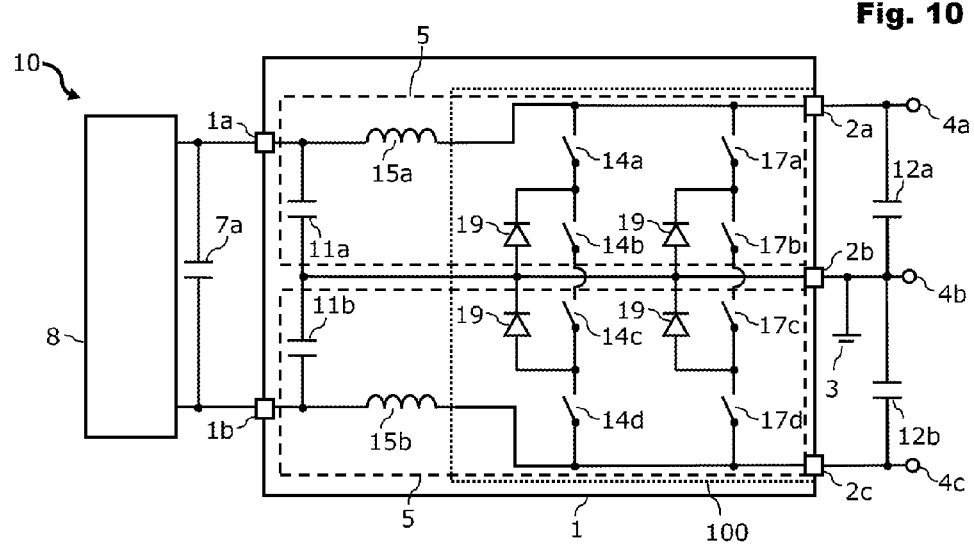
FIG. 10 is a schematic view of a bipolar high-voltage network in accordance with a further embodiment of the invention.
Figure 11:
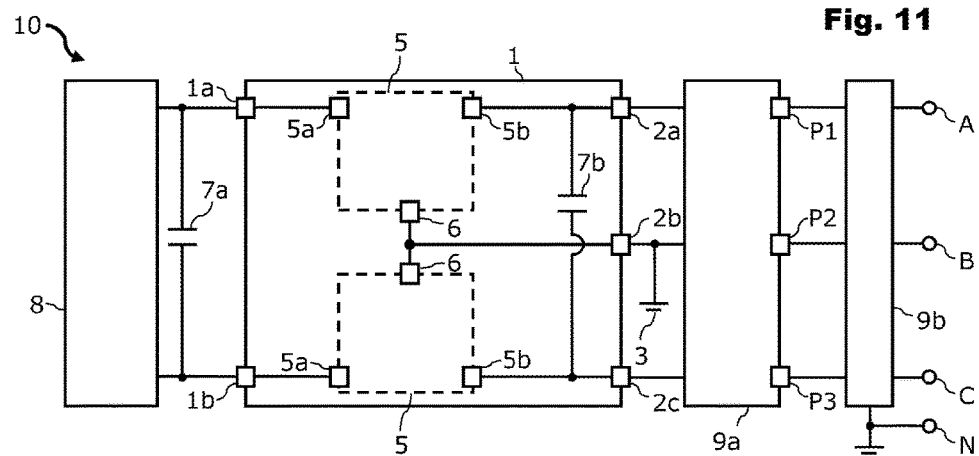
FIG. 11 is a schematic view of a bipolar high-voltage network in accordance with a further embodiment of the invention.

As shown in FIG. 10, a bipolar high-voltage network 10 can also be achieved, which implements down converters for the DC voltage converter modules 5 in the form of half bridges of an open-loop-controlled or non-open-loop-controlled two-point NPC converter 100. A two-point NPC converter 100 allows the polarity of a unipolar input voltage to be commutated with respect to the output connections 2*a* or 2*c* via the input connections 1*a* and 1*b*. In particular, when using DC voltage sources having a DC voltage that alternates in polarity, such as brush motors in H-bridge operation, the two-point NPC converter 100 can take over the necessary commutation. Bipolar LC stages formed in each case of a choke 15*a* or 15*b* and a capacitor 11*a* or 11*b* can be used to filter the unipolar input voltage.

In order to connect a bipolar high-voltage network 10 to an AC voltage network, the high-voltage network 10 can comprise an open-loop-controlled three-point NPC power converter 9*a*, the input of which is coupled to the two bipolar output connections 2*a*, 2*c* and to the reference potential connection 2*b*. The three-point NPC power converter 9*a* comprises, at the output thereof, three AC voltage phase connections P1, P2 and P3, which are coupled via an LC filter stage 9*b* to phase terminals A, B and C and to a neutral wire N of an AC voltage network. Both closed-loop-controlled and non-closed-loop-controlled AC voltage loads can be operated by means of the three-point NPC power converter 9*a*, as shown in detail for example in Barbosa, P.; Steimer, P.; Steinke, J.; Meysenc, L.; Winkelnkemper, M.; Celanovic, N., "Active Neutral-Point-Clamped Multilevel Converters," Power Electronics Specialists Conference, 2005 (PESC '05), IEEE 36th, pp. 2296-2301, June 2005.

The converter switches shown in FIGS. 2 to 11 can in each case be designed as power semiconductor switches, for example MOSFET switches, IGBT switches, BJT switches, JFET switches, bipolar transistors or similar switching elements.

Figure 12:
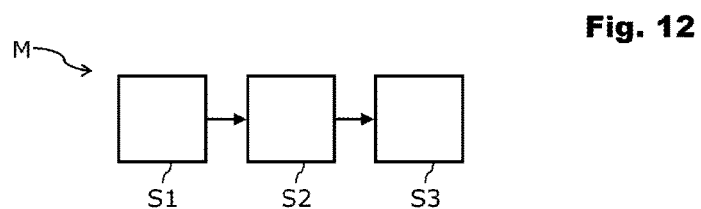
FIG. 12 is a schematic view of a method for operating a bipolar high-voltage network in accordance with a further embodiment of the invention.

FIG. 12 is a schematic view of a method M for operating a bipolar high-voltage network, in particular the high-voltage network 10 shown and described in connection with FIGS. 1 to 11. The method M can be used, for example, if one of the bipolar output connections 2*a* or 2*c* of the DC voltage converter 1 fails, for example if there is an excessively high impedance of one of the output connections 2*a* and 2*c*, i.e., in the event of a high-resistance earth fault, or if there is a short circuit between one of the output connections 2*a* and 2*c* and the reference potential connection 2*b*.

As the first step S1, the method M comprises operating the DC voltage converter 1 to output a bipolar voltage between the bipolar output connections 2*a* or 2*c* and the reference potential connection 2*b* of the DC voltage converter 1. This is the normal mode of operation of the DC voltage converter 1 for achieving a bipolar voltage supply, for example for a bipolar high-voltage network in an aircraft or spacecraft. In step S2, it is detected whether there is a short circuit between a first of the bipolar output connections 2*a* and 2*c* and the reference potential connection 2*b* and/or a high-resistance fault at a first of the bipolar output connections 2*a* or 2*c*. If a fault of this type is present, a switch can be made from the normal mode of operation into an emergency mode of operation by actuating, in step S3, the DC voltage converter 1 to output a unipolar voltage between the second of the bipolar output connections 2*a* and 2*c*, i.e., the output connection not affected by the fault, and the reference potential connection 2*b* of the DC voltage converter 1.

In this case, the DC voltage converter 1 can also temporarily be operated with a short circuit current if a short circuit has been detected. In this connection, this can temporarily include a time period which drives the DC voltage converter up to its current load limit. A short circuit is thus triggered in sub-networks of the high-voltage network 10 that are protected by fuses having overload protection, so that the corresponding overload protection of the sub-networks is activated. If the short circuit has been caused by components in the sub-networks which have been disabled or deactivated as a result, the respective sub-network can be isolated by operating the DC voltage converter 1 in the temporary short circuit current mode and the rest of the high-voltage network 10 can then continue to be operated as normal.

Operating the DC voltage converter 1 in the unipolar mode, i.e., in the emergency mode of operation, can temporarily guarantee a limited operational readiness, even if there were a fault in the system. This advantageously increases the availability and reliability of the high-voltage network. In particular with the topologies for DC voltage converter 1 or high-voltage networks 10 as shown in FIGS. 1 to 11, it is possible to implement a unipolar emergency mode of operation of this type in a simple manner by deactivating the DC voltage converter module 5 that has been affected in each case and by using the other for generating the unipolar voltage.

Figure 13:
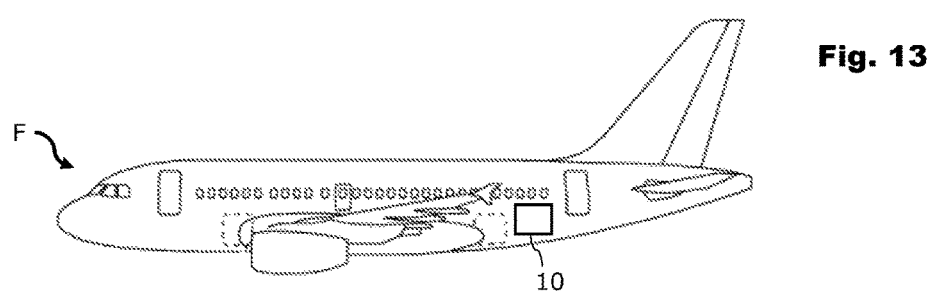
FIG. 13 is a schematic view of an aircraft having a bipolar high-voltage network in accordance with a further embodiment of the invention.

FIG. 13 is a schematic view of an aircraft F comprising a bipolar high-voltage network, for example a bipolar high-voltage network 10 according to FIGS. 1 to 11. The high-voltage network 10 can be used to achieve, in the aircraft, a bipolar DC voltage supply, for example ±270 V, for DC voltage loads in the aircraft F.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating a bipolar high-voltage network for an aircraft or spacecraft which comprises:
    a DC voltage converter comprising two unipolar input connections, two bipolar output connections and a single reference potential connection; and
    at least one unipolar device having only two electrical connections, each one of the two electrical connections being coupled to one of the two unipolar input connections,
    the DC voltage converter comprising a first DC voltage converter module, comprising circuitry comprising two capacitors, two switches and a choke, wherein a first of the two capacitors is connected in series between the module input connection and the reference potential connection, a second of the two capacitors is connected in series between the module output connection and the reference potential connection, the first DC voltage converter model being coupled to a first of the unipolar input connections of the DC voltage converter via a module input connection, to the reference potential connection of the DC voltage converter via a module reference potential connection, and to a first of the bipolar output connections of the DC voltage converter via a module output connection, and
    the DC voltage converter comprising a second DC voltage converter module, comprising circuitry comprising two capacitors, two switches and a choke, wherein a first of the two capacitors is connected in series between the module input connection and the reference potential connection, a second of the two capacitors is connected in series between the module output connection and the reference potential connection, the second DC voltage converter module being coupled to a second of the unipolar input connections of the DC voltage converter via a module input connection, to the reference potential connection of the DC voltage converter via a module reference potential connection, and to a second of the bipolar output connections of the DC voltage converter via a module output connection,
    wherein the two unipolar input connections and the reference potential connection are different connections,
    the method comprising the steps of:
    operating the DC voltage converter in order to output a bipolar voltage between the bipolar output connections and the single reference potential connection of the DC voltage converter;
    detecting whether a short circuit is present between a first of the bipolar output connections and the reference potential connection and/or whether a high-resistance fault is present at a first of the bipolar output connections, and
    operating the DC voltage converter in order to output a unipolar voltage between the second of the bipolar output connections and the reference potential connection of the DC voltage converter if a short circuit and/or a high-resistance fault has been detected.

2. The method according to claim 1, wherein the DC voltage converter modules each comprise non-isolated DC voltage converters.

3. The method according to claim 2, wherein the DC voltage converter modules each comprise down converters.

4. The method according to claim 2, wherein the DC voltage converter modules each comprise up converters.

5. The method according to claim 2, wherein the DC voltage converter modules each comprise inverse converters.

6. The method according to claim 2, wherein the DC voltage converter modules each comprise cascade-connected down/up converters.

7. The method according to claim 6, wherein the DC voltage converter modules each comprise cascade-connected two-point down/up converters.

8. The method according to claim 2, wherein the DC voltage converter modules each comprise open-loop-controlled or non-open-loop-controlled two-point NPC converters.

9. The method according to claim 2, wherein the DC voltage converter modules each comprise split-pi converters.

10. The method according to claim 2, further comprising:
    a unipolar up converter which is coupled between the unipolar input connections of the DC voltage converter and the module input connections of the DC voltage converter modules,
    wherein the DC voltage converter modules each comprise down converters.

11. The method according to claim 10, wherein the down converters of the DC voltage converter modules are formed by an open-loop-controlled or non-open-loop-controlled two-point NPC converter.

12. The method according to claim 1, further comprising:
    an open-loop-controlled three-point NPC power converter, the input of which is coupled to the two bipolar output connections and to the reference potential connection of the DC voltage converter and the output of which comprises three AC voltage phase connections; and an LC filter stage which is coupled to the three AC voltage phase connections of the open-loop-controlled three-point NPC power converter.

13. The method according to claim 1, further comprising:
a first DC voltage intermediate circuit which is coupled between the unipolar input connections of the DC voltage converter; and
a second DC voltage intermediate circuit which is coupled between the bipolar output connections of the DC voltage converter.

14. The method according to claim 1, wherein operating the DC voltage converter comprises temporarily operating the DC voltage converter with a short circuit current if a short circuit has been detected.

15. The method according to claim 1, further comprising two additional switches.

16. The method according to claim 1, further comprising six additional switches and two additional capacitors.

17. The method according to claim 1, further comprising six additional switches, two additional capacitors and four zero diodes.

18. The method according to claim 1, further comprising two additional capacitors, two additional switches and one additional choke.

* * * * *